(12) United States Patent
Lv et al.

(10) Patent No.: US 10,404,606 B2
(45) Date of Patent: Sep. 3, 2019

(54) METHOD AND APPARATUS FOR ACQUIRING VIDEO BITSTREAM

(71) Applicant: Huawei Technologies Co., Ltd., Shenzhen, Guangdong (CN)

(72) Inventors: Zhuoyi Lv, Shenzhen (CN); Jiantong Zhou, Shenzhen (CN); Jiali Fu, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 15/177,751

(22) Filed: Jun. 9, 2016

(65) Prior Publication Data

US 2016/0294711 A1    Oct. 6, 2016

Related U.S. Application Data

(63) Continuation of application No. PCT/CN2014/092583, filed on Nov. 28, 2014.

(30) Foreign Application Priority Data

Dec. 11, 2013 (CN) .......................... 2013 1 0672000

(51) Int. Cl.
*H04L 12/825* (2013.01)
*H04N 21/258* (2011.01)
(Continued)

(52) U.S. Cl.
CPC ............ *H04L 47/25* (2013.01); *H04L 65/601* (2013.01); *H04N 21/23439* (2013.01);
(Continued)

(58) Field of Classification Search
None
See application file for complete search history.

(56) References Cited

U.S. PATENT DOCUMENTS 7,474,791 B2    1/2009   Berkner et al.
9,866,605 B2 *  1/2018   Begen ................. B63B 15/0083
(Continued)

FOREIGN PATENT DOCUMENTS

CN    101511010 A    8/2009
CN    102007774 A    4/2011
(Continued)

OTHER PUBLICATIONS

G. Cermak et al., "The Relationship Among Video Quality, Screen Resolution, and Bit Rate", IEEE Transactions on Broadcasting, vol. 57, No. 2, Jun. 2011, p. 258-262.
(Continued)

*Primary Examiner* — Alexander Q Huerta
(74) *Attorney, Agent, or Firm* — Conley Rose, P.C.

(57) ABSTRACT

Embodiments of the present invention disclose a method and an apparatus for acquiring a video bitstream, and relate to the field of information technologies, which can improve network bandwidth utilization. The method includes: firstly, acquiring, by a terminal, a minimum bit rate corresponding to a parameter of the terminal; then, sending, by the terminal, a video bitstream acquiring request to a server, and when receiving the video bitstream acquiring request sent by the terminal, sending, by the server, an MPD to the terminal; and finally, receiving, by the terminal, the MPD sent by the server, and acquiring a video bitstream according to the MPD and the minimum bit rate. The embodiments of the present invention are applicable to a case in which a user downloads video data by using a terminal.

16 Claims, 6 Drawing Sheets

(51) Int. Cl.
*H04N 21/262* (2011.01)
*H04N 21/442* (2011.01)
*H04N 21/845* (2011.01)
*H04N 21/2343* (2011.01)
*H04N 21/462* (2011.01)
*H04L 29/06* (2006.01)

(52) U.S. Cl.
CPC . *H04N 21/25808* (2013.01); *H04N 21/26258* (2013.01); *H04N 21/44209* (2013.01); *H04N 21/4621* (2013.01); *H04N 21/8456* (2013.01)

(56) References Cited

U.S. PATENT DOCUMENTS

| | | | |
|---|---|---|---|
| 2003/0065803 A1* | 4/2003 | Heuvelman | H04N 21/25808 709/231 |
| 2011/0029606 A1 | 2/2011 | Ozawa | |
| 2011/0088076 A1 | 4/2011 | Li et al. | |
| 2011/0255555 A1* | 10/2011 | Alexander | H04N 21/23805 370/468 |
| 2012/0020413 A1* | 1/2012 | Chen | H04N 19/597 375/240.26 |
| 2012/0099672 A1 | 4/2012 | Wan et al. | |
| 2013/0124749 A1* | 5/2013 | Thang | H04L 65/4092 709/231 |
| 2013/0132986 A1* | 5/2013 | Mack | H04L 65/605 725/14 |
| 2013/0268623 A1* | 10/2013 | Besehanic | H04L 65/607 709/217 |
| 2014/0108622 A1* | 4/2014 | Guo | H04N 21/2662 709/219 |
| 2014/0150046 A1* | 5/2014 | Epstein | H04N 21/23439 725/126 |
| 2014/0201324 A1* | 7/2014 | Zhang | H04L 65/4084 709/217 |
| 2014/0201334 A1* | 7/2014 | Wang | H04L 65/4084 709/219 |
| 2015/0106505 A1* | 4/2015 | Ramaswamy | G06Q 30/02 709/224 |
| 2015/0256861 A1* | 9/2015 | Oyman | H04N 21/2343 725/62 |
| 2015/0340061 A1* | 11/2015 | Yang | G11B 20/10 369/85 |
| 2016/0050246 A1* | 2/2016 | Liao | H04L 5/0085 709/219 |
| 2016/0182594 A1* | 6/2016 | White | H04L 65/607 709/219 |
| 2016/0192296 A1* | 6/2016 | Rehan | H04L 65/604 455/574 |
| 2016/0366454 A1* | 12/2016 | Tatourian | H04N 21/234345 |
| 2018/0013809 A1* | 1/2018 | Gordon | H04N 21/23439 |

FOREIGN PATENT DOCUMENTS

| | | |
|---|---|---|
| CN | 102118357 A | 7/2011 |
| CN | 102130936 A | 7/2011 |
| CN | 102595204 A | 7/2012 |
| CN | 103167318 A | 6/2013 |
| CN | 103248962 A | 8/2013 |
| EP | 2942970 A1 | 11/2015 |
| WO | 2013001426 A1 | 1/2013 |
| WO | 2013017165 A1 | 2/2013 |

OTHER PUBLICATIONS

Joao Espadanal Goncalves et at., "Implementing a QoS-Aware, Context-Aware and Personalized WebTV", IEEE, Jun. 2, 2010, 8 pages.

* cited by examiner

US 10,404,606 B2

METHOD AND APPARATUS FOR ACQUIRING VIDEO BITSTREAM

CROSS-REFERENCE TO RELATED APPLICATIONS

This application is a continuation of International Application No. PCT/CN2014/092583, filed on Nov. 28, 2014, which claims priority to Chinese Patent Application No. 201310672000.1, filed on Dec. 11, 2013, both of which are hereby incorporated by reference in their entireties.

TECHNICAL FIELD

The present invention relates to the field of information technologies, and in particular, to a method and an apparatus for acquiring a video bitstream.

BACKGROUND

With network development and popularization of high-resolution terminals, a client imposes an increasingly strict requirement on view experience of an online video. In a streaming application, a DASH (Dynamic Adaptive Streaming over HTTP) technology may provide required media data to a user. The DASH technology incorporates a traditional streaming technology and a progressive download technology.

Currently, when a required video bitstream is being provided for a user, firstly, a client detects real-time network bandwidth, and sends the real-time network bandwidth to a server, and then, the server acquires a corresponding bit rate according to the real-time network bandwidth, and provides, for the user, a video bitstream generated by encoding according to the bit rate.

However, when a corresponding bit rate is acquired by using network bandwidth, and a terminal that imposes a relatively loose requirement on image quality of video data is being used, image quality of a video bitstream directly generated by encoding according to the bit rate acquired by using the network bandwidth is relatively high, and a case in which the network bandwidth is wasted exists, thereby leading to low utilization of the network bandwidth.

SUMMARY

Embodiments of the present invention provide a method and an apparatus for acquiring a video bitstream, which can improve utilization of network bandwidth.

Technical solutions adopted in the embodiments of the present invention are as follows:

According to a first aspect, an embodiment of the present invention provides a method for acquiring a video bitstream, including:

acquiring, by a terminal, a minimum bit rate corresponding to a parameter of the terminal;

sending, by the terminal, a video bitstream acquiring request to a server, where the video bitstream acquiring request includes an identifier of video data that needs to be acquired, so that the server sends a media index description MPD to the terminal according to the identifier of the video data, where the MPD includes a correspondence between a minimum bit rate corresponding to each physical size and each video bitstream corresponding to the video data;

receiving, by the terminal, the MPD sent by the server; and acquiring, by the terminal, a video bitstream according to the MPD and the minimum bit rate.

With reference to the first aspect, in a first implementation manner of the first aspect, before the step of acquiring, by a terminal, a minimum bit rate corresponding to a parameter of the terminal, the method further includes:

acquiring, by the terminal, the parameter of the terminal.

With reference to the first implementation manner of the first aspect, in a second implementation manner of the first aspect, the parameter includes a physical size of the terminal;

the step of acquiring, by the terminal, the parameter of the terminal includes:

acquiring, by the terminal, the physical size of the terminal; and the step of acquiring, by a terminal, a minimum bit rate corresponding to a parameter of the terminal includes:

acquiring, by the terminal according to a formula $r_{min}=u \times a^2 \times s^3 + v \times a \times s^2 + w \times s$, a minimum bit rate corresponding to the physical size, where s is the physical size of the terminal, and u, v, w, and a are fixed values.

With reference to the second implementation manner of the first aspect, in a third implementation manner of the first aspect, the step of acquiring, by the terminal, the physical size of the terminal includes:

acquiring, by the terminal, a physical size of a video display window of the terminal.

With reference to the first aspect or the first implementation manner of the first aspect or the second implementation manner of the first aspect or the third implementation manner of the first aspect, in a fourth implementation manner of the first aspect, the step of acquiring, by the terminal, a video bitstream according to the MPD and the minimum bit rate includes:

searching, by the terminal, for a target bit rate, where the target bit rate is a bit rate that matches the minimum bit rate; and acquiring, by the terminal according to the MPD, a video bitstream corresponding to the target bit rate.

With reference to the fourth implementation manner of the first aspect, in a fifth implementation manner of the first aspect, after the step of acquiring, by a terminal, a minimum bit rate corresponding to a parameter of the terminal, the method further includes:

acquiring, by the terminal, real-time network bandwidth; and determining, by the terminal, whether the real-time network bandwidth is greater than or equal to the minimum bit rate, where the step of sending, by the terminal, a video bitstream acquiring request to a server includes:

if the real-time network bandwidth is greater than or equal to the minimum bit rate, sending, by the terminal, the video bitstream acquiring request to the server; or if the real-time network bandwidth is less than the minimum bit rate, sending, by the terminal, a transcoding request to the server, where the transcoding request carries a proportional relationship between the minimum bit rate and the real-time network bandwidth, so that the server transcodes, according to the proportional relationship, the video bitstream corresponding to the target bit rate.

According to a second aspect, an embodiment of the present invention provides an apparatus for acquiring a video bitstream, including:

an acquiring unit, configured to acquire a minimum bit rate corresponding to a parameter of a terminal;

a sending unit, configured to: when the acquiring unit acquires the minimum bit rate, send a video bitstream acquiring request to a server, where the video bitstream acquiring request includes an identifier of video data that needs to be acquired; and a receiving unit, configured to: when the sending unit completes sending of the video bitstream acquiring request, receive the MPD sent by the server, where the MPD includes a correspondence between a minimum bit rate corresponding to each physical size and each video bitstream corresponding to the video data, where the acquiring unit is further configured to acquire a video bitstream according to the MPD received by the receiving unit and the minimum bit rate.

With reference to the second aspect, in a first implementation manner of the second aspect, the acquiring unit is further configured to acquire the parameter of the terminal.

With reference to the first implementation manner of the second aspect, in a second implementation manner of the second aspect, the acquiring unit is specifically configured to acquire a physical size of the terminal; and the acquiring unit is further specifically configured to acquire, according to a formula $r_{min}=u \times a^2 \times s^3 + v \times a \times s^2 + w \times s$, a minimum bit rate corresponding to the physical size, where s is the physical size of the terminal, and u, v, w, and a are fixed values.

With reference to the second implementation manner of the second aspect, in a third implementation manner of the second aspect, the acquiring unit is specifically configured to acquire a physical size of a video display window of the terminal.

With reference to the second aspect or the first implementation manner of the second aspect or the second implementation manner of the second aspect or the third implementation manner of the second aspect, in a fourth implementation manner of the second aspect, the acquiring unit includes:

a search module, configured to search for a target bit rate, where the target bit rate is a bit rate that matches the minimum bit rate; and an acquiring module, configured to acquire, according to the MPD, a video bitstream corresponding to the target bit rate searched for by the search module.

With reference to the fourth implementation manner of the second aspect, in a fifth implementation manner of the second aspect, the apparatus further includes a determining unit;

the acquiring unit is further configured to acquire real-time network bandwidth;

the determining unit is configured to determine whether the real-time network bandwidth acquired by the acquiring unit is greater than or equal to the minimum bit rate; and the sending unit is specifically configured to: when the determining unit determines that the real-time network bandwidth is greater than or equal to the minimum bit rate, send the video bitstream acquiring request to the server; or when the determining unit determines that the real-time network bandwidth is less than the minimum bit rate, send a transcoding request to the server, where the transcoding request carries a proportional relationship between the minimum bit rate and the real-time network bandwidth.

According to a third aspect, an embodiment of the present invention provides a method for acquiring a video bitstream, including:

receiving, by a server, a video bitstream acquiring request sent by a terminal, where the video bitstream acquiring request carries an identifier corresponding to video data that needs to be acquired by the terminal; and sending, by the server, a media index description MPD to the terminal, where the MPD includes a correspondence between a minimum bit rate corresponding to each physical size and each video bitstream corresponding to the video data, so that the terminal acquires a video bitstream according to the MPD and a minimum bit rate.

With reference to the third aspect, in a first implementation manner of the third aspect, before the step of receiving, by a server, a video bitstream acquiring request sent by a terminal, the method further includes:

acquiring, by the server, physical sizes corresponding to a terminal;

acquiring, by the server according to a formula $r_{min}=u \times a^2 \times s^3 + v \times a \times s^2 + w \times s$, the minimum bit rate corresponding to each physical size, where s is the physical size corresponding to the terminal, and u, v, w, and a are fixed values; and establishing, by the server in the MPD, the correspondence between the minimum bit rate corresponding to each physical size and each video bitstream corresponding to the video data, so that the terminal acquires the video bitstream according to the correspondence between the minimum bit rate corresponding to each physical size and each video bitstream corresponding to the video data.

With reference to the third aspect or the first implementation manner of the third aspect, in a second implementation manner of the third aspect, before the step of sending, by the server, a media index description MPD to the terminal, the method further includes:

receiving, by the server, a transcoding request sent by the terminal, where the transcoding request carries a proportional relationship between the minimum bit rate and real-time network bandwidth; and transcoding, by the server according to the proportional relationship, the video bitstream corresponding to the minimum bit rate.

According to a fourth aspect, an embodiment of the present invention provides an apparatus for acquiring a video bitstream, including:

a receiving unit, configured to receive a video bitstream acquiring request sent by a terminal, where the video bitstream acquiring request carries an identifier corresponding to video data that needs to be acquired by the terminal; and a sending unit, configured to: when the receiving unit receives the video bitstream acquiring request, send a media index description MPD to the terminal, where the MPD includes a correspondence between a minimum bit rate corresponding to each physical size and each video bitstream corresponding to the video data.

With reference to the fourth aspect, in a first implementation manner of the fourth aspect, the apparatus further includes an acquiring unit and an establishment unit;

the acquiring unit is configured to acquire physical sizes corresponding to a terminal;

the acquiring unit is further configured to acquire, according to a formula $r_{min}=u \times a^2 \times s^3 + v \times a \times s^2 + w \times s$, the minimum bit rate corresponding to each physical size, where s is the physical size corresponding to the terminal, and u, v, w, and a are fixed values; and the establishment unit is configured to establish, in the MPD, the correspondence between the minimum bit rate corresponding to each physical size acquired by the acquiring unit and each video bitstream corresponding to the video data.

With reference to the fourth aspect or the first implementation manner of the fourth aspect, in a second implementation manner of the fourth aspect, the apparatus further includes a transcoding unit;

the receiving unit is further configured to receive a transcoding request sent by the terminal, where the transcoding request carries a proportional relationship between a minimum bit rate and real-time network bandwidth; and the transcoding unit is configured to transcode, according to the proportional relationship received by the receiving unit, a video bitstream corresponding to the minimum bit rate.

According to the method and the apparatus for acquiring a video bitstream provided in the embodiments of the present invention, firstly, a terminal acquires a minimum bit rate corresponding to a parameter of the terminal; then, the terminal sends a video bitstream acquiring request to a server, and when receiving the video bitstream acquiring request sent by the terminal, the server sends an MPD to the terminal; and finally, the terminal receives the MPD sent by the server, and acquires a video bitstream according to the MPD and the minimum bit rate. Compared with a current case in which a corresponding bit rate is acquired by using network bandwidth, in the embodiments of the present invention, corresponding video bitstreams can be acquired, by using minimum bit rates corresponding to parameters of terminals, for the terminals that have different parameters, which can avoid a case in which a waste of network bandwidth exists when a terminal that imposes a relatively loose requirement on image quality of video data is being used, and can further improve utilization of the network bandwidth.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
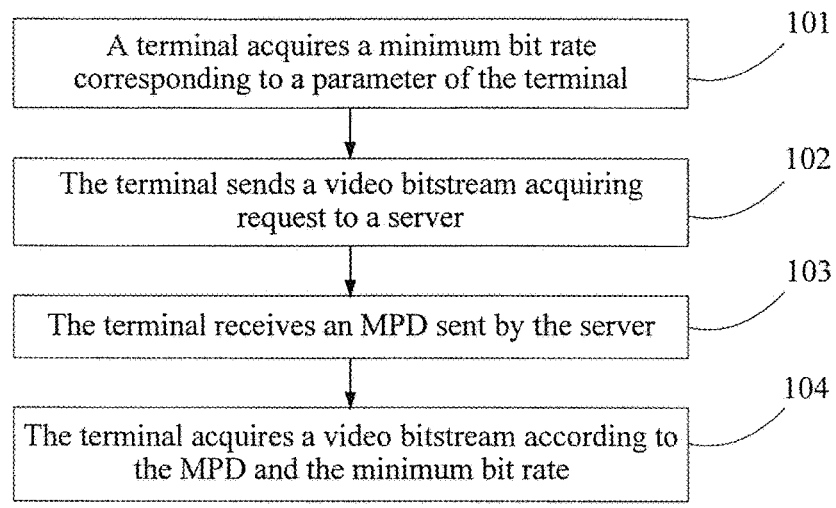
FIG. 1 is a flowchart of a method for acquiring a video bitstream according to Embodiment 1 of the present invention.

This embodiment of the present invention provides a method for acquiring a video bitstream. As shown in FIG. 1, the method includes the following steps:

101. A terminal acquires a minimum bit rate corresponding to a parameter of the terminal.

In this embodiment of the present invention, the parameter of the terminal may be a physical size of the terminal. In this embodiment of the present invention, the terminal may acquire the parameter of the terminal by using a protocol, or may acquire the parameter of the terminal by calling a function, which is not limited in this embodiment of the present invention.

For example, if the terminal is a computer, the terminal may acquire, by using a video card inside the computer and according to a DDC/CI (Display Data Channel Command Interface) protocol, the parameter of the terminal that is stored in a DDC (Display Data Channel) chip. If the terminal is a mobile phone, the terminal may acquire the parameter of the terminal by calling a function of the DisplayMetric class in a system package by using a program.

102. The terminal sends a video bitstream acquiring request to a server.

The video bitstream acquiring request includes an identifier of video data that needs to be acquired.

In this embodiment of the present invention, the terminal sends the video bitstream acquiring request to the server, so that the server sends a media index description (MPD) to the terminal according to the identifier of the video data.

The MPD includes a correspondence between a minimum bit rate corresponding to each physical size and each video bitstream corresponding to the video data. In this embodiment of the present invention, each video bitstream is obtained by the server by encoding original video data according to each bit rate, and for each physical size in the MPD, there is a minimum bit rate and a video bitstream that are corresponding to the physical size.

103. The terminal receives an MPD sent by the server.

104. The terminal acquires a video bitstream according to the MPD and the minimum bit rate.

Figure 2:
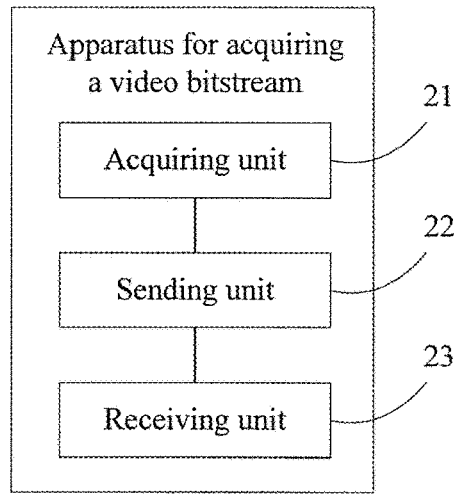
FIG. 2 is a schematic structural diagram of an apparatus for acquiring a video bitstream according to Embodiment 1 of the present invention.

Further, for specific implementation of the method shown in FIG. 1, this embodiment of the present invention provides an apparatus for acquiring a video bitstream. As shown in FIG. 2, an entity of the apparatus may be a terminal such as a PC (Personal Computer), a mobile phone, or a tablet computer, and the apparatus includes an acquiring unit 21, a sending unit 22, and a receiving unit 23.

The acquiring unit 21 is configured to acquire a minimum bit rate corresponding to a parameter of the terminal.

The sending unit 22 is configured to: when the acquiring unit 21 acquires the minimum bit rate, send a video bitstream acquiring request to a server.

The video bitstream acquiring request includes an identifier of video data that needs to be acquired.

The receiving unit 23 is configured to: when the sending unit 22 completes sending of the video bitstream acquiring request, receive an MPD sent by the server.

The MPD includes a correspondence between a minimum bit rate corresponding to each physical size and each video bitstream corresponding to the video data.

The acquiring unit 21 is further configured to acquire a video bitstream according to the MPD received by the receiving unit 23 and the minimum bit rate.

Figure 3:
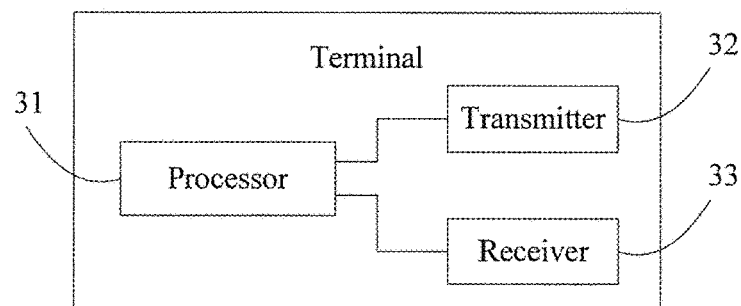
FIG. 3 is a schematic structural diagram of a client according to Embodiment 1 of the present invention.

Still further, an entity of the apparatus for acquiring a video bitstream may be a terminal. As shown in FIG. 3, the client may include a processor 31, a transmitter 32, and a receiver 33.

The processor 31 is configured to acquire a minimum bit rate corresponding to a parameter of the terminal.

The transmitter 32 is configured to send a video bitstream acquiring request to a server.

The video bitstream acquiring request includes an identifier of video data that needs to be acquired.

The receiver 33 is configured to receive an MPD sent by the server.

The MPD includes a correspondence between a minimum bit rate corresponding to each physical size and each video bitstream corresponding to the video data.

The processor 31 is further configured to acquire a video bitstream according to the MPD and the minimum bit rate.

It should be noted that for other corresponding descriptions corresponding to the functional units of the apparatus for acquiring a video bitstream provided in this embodiment of the present invention, reference may be made to corresponding descriptions in FIG. 1, and details are not described herein again.

According to the method and the apparatus for acquiring a video bitstream provided in this embodiment of the present invention, firstly, a terminal acquires a minimum bit rate corresponding to a parameter of the terminal; then, the terminal sends a video bitstream acquiring request to a server, and when receiving the video bitstream acquiring request sent by the terminal, the server sends an MPD to the terminal; and finally, the terminal receives the MPD sent by the server, and acquires a video bitstream according to the MPD and the minimum bit rate. Compared with a current case in which a corresponding bit rate is acquired by using network bandwidth, in this embodiment of the present invention, corresponding video bitstreams can be acquired, by using minimum bit rates corresponding to parameters of terminals, for the terminals that have different parameters, which can avoid a case in which a waste of network bandwidth exists when a terminal that imposes a relatively loose requirement on image quality of video data is being used, and can further improve utilization of the network bandwidth.

Embodiment 2

Figure 4:
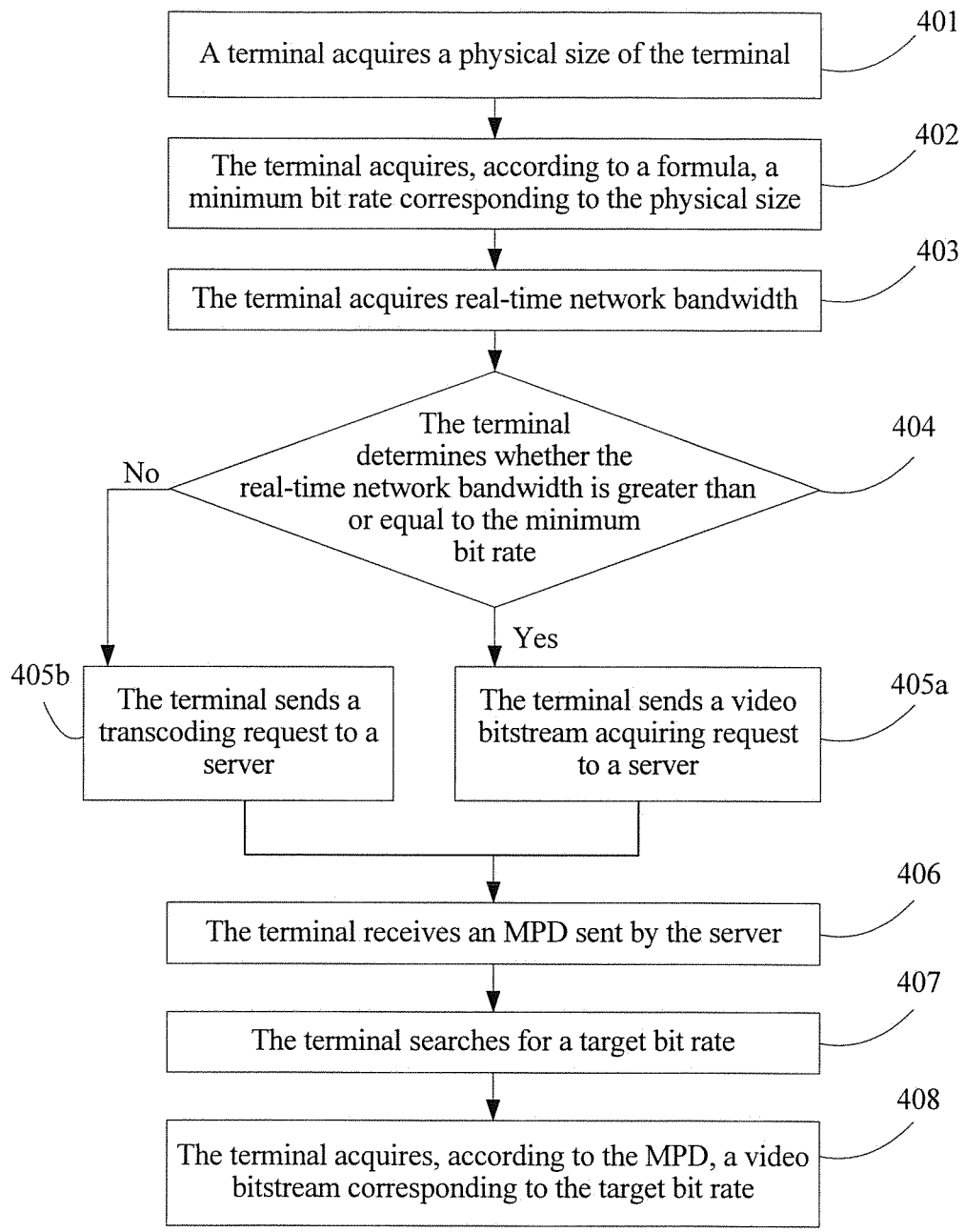
FIG. 4 is a flowchart of a method for acquiring a video bitstream according to Embodiment 2 of the present invention.

This embodiment of the present invention provides a method for acquiring a video bitstream. As shown in FIG. 4, the method includes the following steps:

401. A terminal acquires a physical size of the terminal.

In this embodiment of the present invention, the terminal may acquire the physical size of the terminal by using a protocol, or may acquire the physical size of the terminal by calling a function, which is not limited in this embodiment of the present invention.

For example, if the terminal is a computer, the terminal may acquire, by using a video card inside the computer and according to a DDC/CI (Display Data Channel Command Interface) protocol, the physical size of the terminal that is stored in a DDC (Display Data Channel) chip. If the terminal is a mobile phone, the terminal may acquire the physical size of the terminal by calling a function of the DisplayMetric class in a system package by using a program.

Preferably, step 401 may be: the terminal acquires a physical size of a video display window of the terminal. In this embodiment of the present invention, the terminal acquires the physical size of the video display window of the terminal, so that an actual physical size of the video display window may be acquired when the video display window is not displayed in full screen on the terminal.

For example, if the physical size of the terminal is 19 inches, and the physical size of the video display window of the terminal is 10 inches, the physical size that is of the video display window of the terminal and acquired by the terminal is 10 inches.

402. The terminal acquires, according to a formula $r_{min}=u \times a^2 \times s^3 + v \times a \times s^2 + w \times s$, a minimum bit rate corresponding to the physical size.

In the formula, s is the physical size of the terminal, and u, v, w, and a are fixed values.

403. The terminal acquires real-time network bandwidth.

Specifically, the terminal may acquire the real-time network bandwidth according to a preset period. The preset period may be configured by the terminal in advance, or may be configured by a server in advance, which is not limited in this embodiment of the present invention.

404. The terminal determines whether the real-time network bandwidth is greater than or equal to the minimum bit rate.

If the real-time network bandwidth is greater than or equal to the minimum bit rate, step 405a is performed: the terminal sends a video bitstream acquiring request to a server.

The video bitstream acquiring request includes an identifier of video data that needs to be acquired. In this embodiment of the present invention, the terminal can fluently play a video resource only when the real-time network bandwidth is greater than or equal to the minimum bit rate; therefore, when the real-time network bandwidth is greater than or equal to the minimum bit rate, the terminal sends the video bitstream acquiring request to the server.

Further, the server sends a media index description (MPD) to the terminal according to the identifier of the video data. The MPD includes a correspondence between a minimum bit rate corresponding to each physical size and each video bitstream corresponding to the video data. In this embodiment of the present invention, each video bitstream is obtained by the server by encoding original video data according to each bit rate, and for each physical size in the MPD, there is a minimum bit rate and a video bitstream that are corresponding to the physical size.

If the real-time network bandwidth is less than the minimum bit rate, step 405b is performed: the terminal sends a transcoding request to a server.

The transcoding request carries a proportional relationship between the minimum bit rate and the real-time network bandwidth.

In this embodiment of the present invention, the terminal cannot fluently play a video resource when the real-time network bandwidth is less than the minimum bit rate; therefore, the terminal can fluently play the video resource only after the server performs transcoding processing on the video bitstream.

Further, the server transcodes, according to the proportional relationship, a video bitstream corresponding to a target bit rate.

In this embodiment of the present invention, after transcoding the video bitstream, the server establishes, in the MPD, a correspondence between a minimum bit rate obtained after transcoding and a corresponding video bitstream, so that it can be implemented that the terminal acquires a corresponding video bitstream according to the correspondence, in the MPD, between a minimum bit rate obtained after transcoding and a corresponding video bitstream.

406. The terminal receives an MPD sent by the server.

407. The terminal searches for a target bit rate.

The target bit rate is a bit rate that matches the minimum bit rate. A bit rate that is in bit rates included in the MPD and matches the minimum bit rate may be a bit rate that is in the bit rates and the same as the minimum bit rate or a smallest bit rate in bit rates greater than the minimum bit rate.

In this embodiment of the present invention, the terminal acquires the bit rates greater than the minimum bit rate from the bit rates included in the MPD, so that a blocking artifact does not occur when a video bitstream corresponding to a bit rate is being played, and view experience of a user can be improved. Further, the terminal searches the bit rates greater than the minimum bit rate for the smallest bit rate and uses the smallest bit rate as the target bit rate, so that a waste of bandwidth can be avoided when the blocking artifact does not occur, and utilization of the network bandwidth can be improved.

408. The terminal acquires, according to the MPD, a video bitstream corresponding to the target bit rate.

Figure 5:
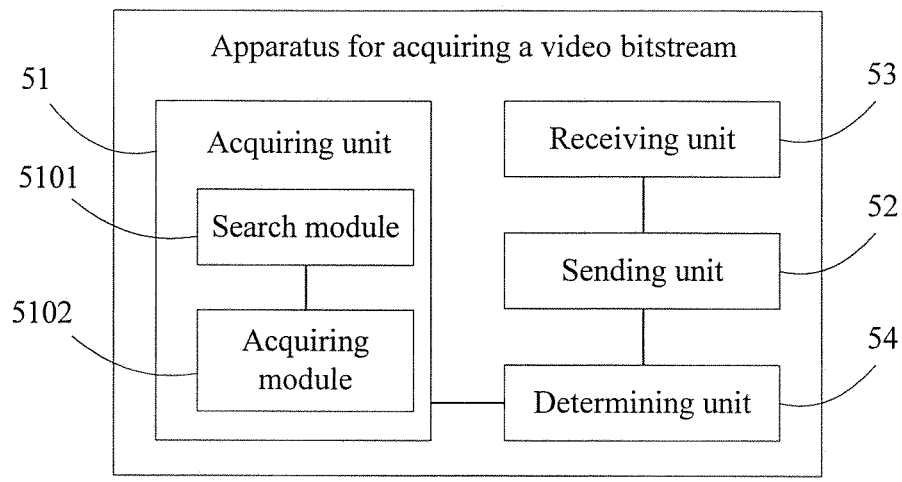
FIG. 5 is a schematic structural diagram of an apparatus for acquiring a video bitstream according to Embodiment 2 of the present invention.

Further, for specific implementation of the method shown in FIG. 4, this embodiment of the present invention provides an apparatus for acquiring a video bitstream. As shown in FIG. 5, an entity of the apparatus may be a terminal such as a PC (Personal Computer), a mobile phone, or a tablet computer, and the apparatus includes an acquiring unit 51, a sending unit 52, and a receiving unit 53.

The acquiring unit 51 is configured to acquire a minimum bit rate corresponding to a parameter of the terminal.

The sending unit 52 is configured to: when the acquiring unit 51 acquires the minimum bit rate, send a video bitstream acquiring request to a server.

The video bitstream acquiring request includes an identifier of video data that needs to be acquired.

The receiving unit 53 is configured to: when the sending unit 52 completes sending of the video bitstream acquiring request, receive an MPD sent by the server.

The MPD includes a correspondence between a minimum bit rate corresponding to each physical size and each video bitstream corresponding to the video data.

The acquiring unit 51 is further configured to acquire a video bitstream according to the MPD received by the receiving unit 53 and the minimum bit rate.

The acquiring unit 51 is further configured to acquire the parameter of the terminal.

The acquiring unit 51 is specifically configured to acquire a physical size of the terminal.

The acquiring unit 51 is further specifically configured to acquire, according to a formula $r_{min}=u \times a^2 \times s^3 + v \times a \times s^2 + w \times s$, a minimum bit rate corresponding to the physical size.

In the formula, s is the physical size of the terminal, and u, v, w, and a are fixed values.

The acquiring unit 51 is specifically configured to acquire a physical size of a video display window of the terminal.

The acquiring unit 51 includes a search module 5101 and an acquiring module 5102.

The search module 5101 is configured to search for a target bit rate.

The target bit rate is a bit rate that matches the minimum bit rate.

The acquiring module 5102 is configured to acquire, according to the MPD, a video bitstream corresponding to the target bit rate searched for by the search module 5101.

Optionally, the apparatus may further include a determining unit 54.

The acquiring unit 51 is further configured to acquire real-time network bandwidth.

The determining unit 54 is configured to determine whether the real-time network bandwidth acquired by the acquiring unit 51 is greater than or equal to the minimum bit rate.

The sending unit 52 is specifically configured to: when the determining unit 54 determines that the real-time network bandwidth is greater than or equal to the minimum bit rate, send the video bitstream acquiring request to the server; or when the determining unit 54 determines that the real-time network bandwidth is less than the minimum bit rate, send a transcoding request to the server.

The transcoding request carries a proportional relationship between the minimum bit rate and the real-time network bandwidth.

Figure 6:
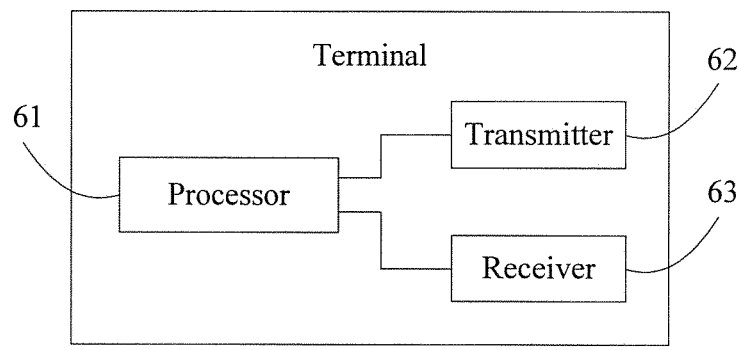
FIG. 6 is a schematic structural diagram of a server according to Embodiment 2 of the present invention.

Still further, an entity of the apparatus for acquiring a video bitstream may be a terminal. As shown in FIG. 6, the client may include a processor 61, a transmitter 62, and a receiver 63.

The processor 61 is configured to acquire a minimum bit rate corresponding to a parameter of the terminal.

The transmitter 62 is configured to send a video bitstream acquiring request to a server.

The video bitstream acquiring request includes an identifier of video data that needs to be acquired.

The receiver 63 is configured to receive an MPD sent by the server.

The MPD includes a correspondence between a minimum bit rate corresponding to each physical size and each video bitstream corresponding to the video data.

The processor 61 is further configured to acquire a video bitstream according to the MPD and the minimum bit rate.

The processor 61 is further configured to acquire the parameter of the terminal.

The processor 61 is further configured to acquire a physical size of the terminal.

The processor 61 is further configured to acquire, according to a formula $r_{min}=u \times a^2 \times s^3 + v \times a \times s^2 + w \times s$, a minimum bit rate corresponding to the physical size.

In the formula, s is the physical size of the terminal, and u, v, w, and a are fixed values.

The processor 61 is further configured to acquire a physical size of a video display window of the terminal.

The processor 61 is further configured to search for a target bit rate.

The target bit rate is a bit rate that matches the minimum bit rate.

The processor 61 is further configured to acquire, according to the MPD, a video bitstream corresponding to the target bit rate.

The processor 61 is further configured to acquire real-time network bandwidth.

The processor 61 is further configured to determine whether the real-time network bandwidth is greater than or equal to the minimum bit rate.

The transmitter 62 is further configured to: when the real-time network bandwidth is greater than or equal to the minimum bit rate, send the video bitstream acquiring request to the server.

The transmitter 62 is further configured to: when the real-time network bandwidth is less than the minimum bit rate, send a transcoding request to the server.

The transcoding request carries a proportional relationship between the minimum bit rate and the real-time network bandwidth.

It should be noted that for other corresponding descriptions corresponding to the functional units of the apparatus for acquiring a video bitstream provided in this embodiment of the present invention, reference may be made to corresponding descriptions in FIG. 4, and details are not described herein again.

According to the method and the apparatus for acquiring a video bitstream provided in this embodiment of the present invention, firstly, a terminal acquires a minimum bit rate corresponding to a parameter of the terminal; then, the terminal sends a video bitstream acquiring request to a server, and when receiving the video bitstream acquiring request sent by the terminal, the server sends an MPD to the terminal; and finally, the terminal receives the MPD sent by the server, and acquires a video bitstream according to the MPD and the minimum bit rate. Compared with a current case in which a corresponding bit rate is acquired by using network bandwidth, in this embodiment of the present invention, corresponding video bitstreams can be acquired, by using minimum bit rates corresponding to parameters of terminals, for the terminals that have different parameters, which can avoid a case in which a waste of network bandwidth exists when a terminal that imposes a relatively loose requirement on image quality of video data is being used, and can further improve utilization of the network bandwidth.

Embodiment 3

701. A server receives a video bitstream acquiring request sent by a terminal.

The video bitstream acquiring request carries an identifier corresponding to video data that needs to be acquired by the terminal.

702. The server sends a media index description (MPD) to the terminal.

The MPD includes a correspondence between a minimum bit rate corresponding to each physical size and each video bitstream corresponding to the video data. In this embodiment of the present invention, each video bitstream is obtained by the server by encoding original video data according to each bit rate, and for each physical size in the MPD, there is a minimum bit rate and a video bitstream that are corresponding to the physical size.

In this embodiment of the present invention, the server sends the MPD to the terminal, so that the terminal acquires a video bitstream according to the MPD and a minimum bit rate.

Figure 7:
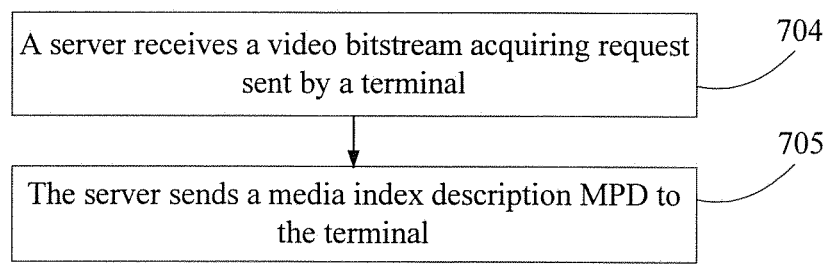
FIG. 7 is a flowchart of a method for acquiring a video bitstream according to Embodiment 3 of the present invention.
Figure 8:
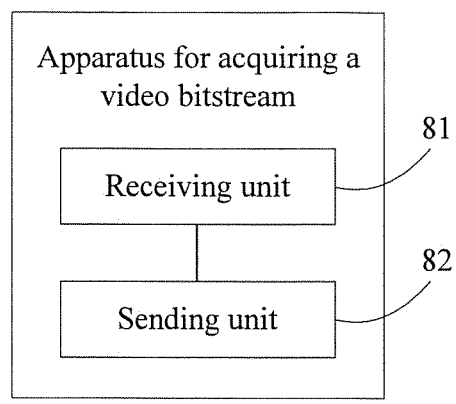
FIG. 8 is a schematic structural diagram of an apparatus for acquiring a video bitstream according to Embodiment 3 of the present invention.

Further, for specific implementation of the method shown in FIG. 7, this embodiment of the present invention provides an apparatus for acquiring a video bitstream. As shown in FIG. 8, an entity of the apparatus may be a server, and the apparatus includes a receiving unit 81 and a sending unit 82.

The receiving unit 81 is configured to receive a video bitstream acquiring request sent by a terminal.

The video bitstream acquiring request carries an identifier corresponding to video data that needs to be acquired by the terminal.

The sending unit 82 is configured to: when the receiving unit 81 receives the video bitstream acquiring request, send a media index description MPD to the terminal.

Figure 9:
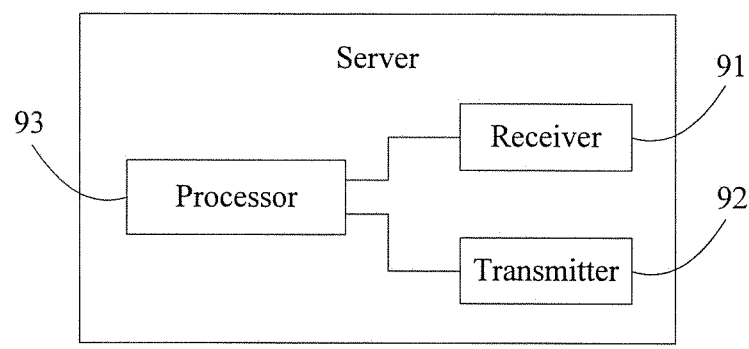
FIG. 9 is a schematic structural diagram of a client according to Embodiment 3 of the present invention.

The MPD includes a correspondence between a minimum bit rate corresponding to each physical size and each video bitstream corresponding to the video data. Still further, an entity of the apparatus for acquiring a video bitstream may be a server. As shown in FIG. 9, the server may include a receiver 91, a transmitter 92, and a processor 93, and the processor 93 is connected to both the receiver 91 and the transmitter 92.

The receiver 91 is configured to receive a video bitstream acquiring request sent by a terminal.

The video bitstream acquiring request carries an identifier corresponding to video data that needs to be acquired by the terminal.

The transmitter 92 is configured to send a media index description MPD to the terminal.

The MPD includes a correspondence between a minimum bit rate corresponding to each physical size and each video bitstream corresponding to the video data.

It should be noted that for other corresponding descriptions corresponding to the functional units of the apparatus for acquiring a video bitstream provided in this embodiment of the present invention, reference may be made to corresponding descriptions in FIG. 6, and details are not described herein again.

According to the method and the apparatus for acquiring a video bitstream provided in this embodiment of the present invention, firstly, a terminal acquires a minimum bit rate corresponding to a parameter of the terminal; then, the terminal sends a video bitstream acquiring request to a server, and when receiving the video bitstream acquiring request sent by the terminal, the server sends an MPD to the terminal; and finally, the terminal receives the MPD sent by the server, and acquires a video bitstream according to the MPD and the minimum bit rate. Compared with a current case in which a corresponding bit rate is acquired by using network bandwidth, in this embodiment of the present invention, corresponding video bitstreams can be acquired, by using minimum bit rates corresponding to parameters of terminals, for the terminals that have different parameters, which can avoid a case in which a waste of network bandwidth exists when a terminal that imposes a relatively loose requirement on image quality of video data is being used, and can further improve utilization of the network bandwidth.

Embodiment 4

Figure 10:
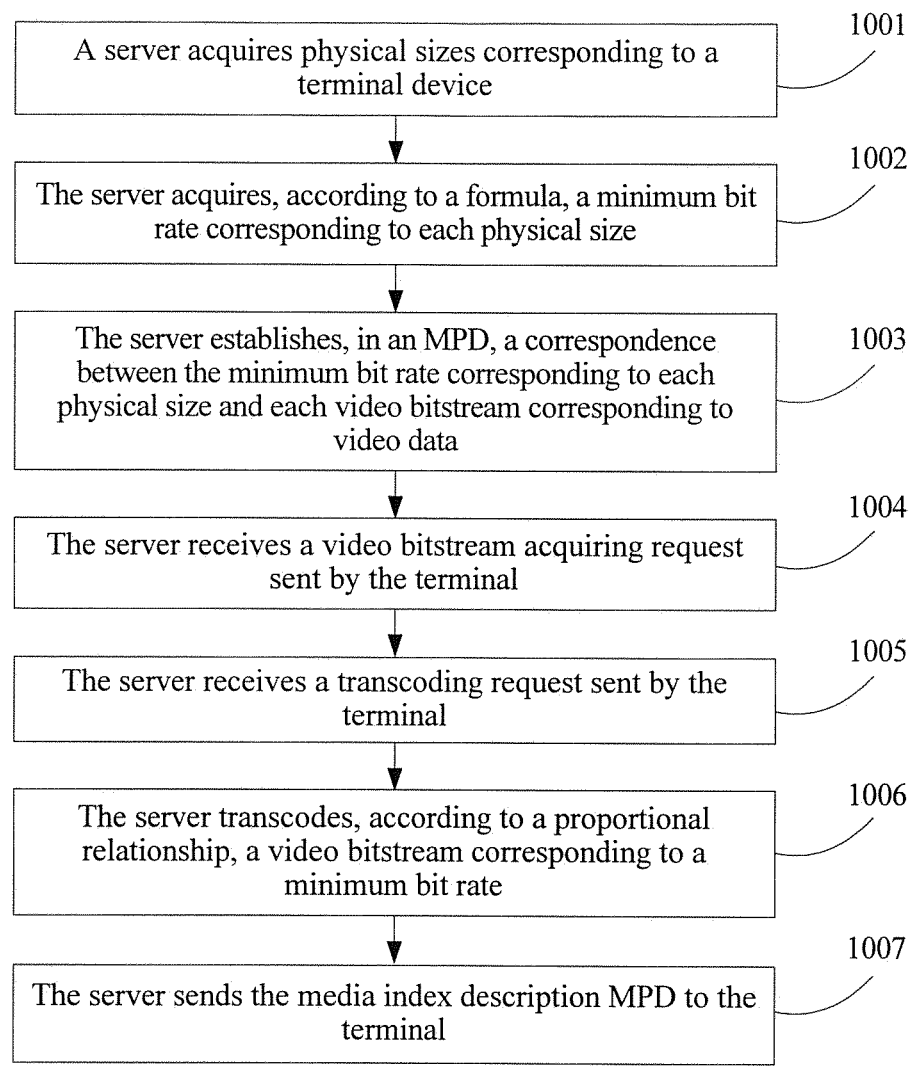
FIG. 10 is a flowchart of a method for acquiring a video bitstream according to Embodiment 4 of the present invention.

This embodiment of the present invention provides a method for acquiring a video bitstream. As shown in FIG. 10, the method includes the following steps:

1001. A server acquires physical sizes corresponding to a terminal.

In this embodiment of the present invention, the server may acquire typical physical sizes corresponding to different terminal types. Specific sizes may be shown in the following table:

| Terminal type | Typical size (unit: inch) |
|---|---|
| Liquid-crystal display television set | 80, 70, 60, 50, 40, 30, 20 |
| Computer display | 22, 19, 17, 14 |
| Tablet computer | 10.1, 9.7 |
| Mobile phone | 6, 5 |

1002. The server acquires, according to a formula $r_{min}=u \times a^2 \times s^3 + v \times a \times s^2 + w \times s$, a minimum bit rate corresponding to each physical size.

In the formula, s is the physical size corresponding to the terminal, and u, v, w, and a are fixed values.

In this embodiment of the present invention, the server separately configures corresponding encoding parameters according to the minimum bit rates corresponding to the physical sizes, and separately encodes video data according to the encoding parameters, so as to generate video bitstreams corresponding to the physical sizes.

1003. The server establishes, in an MPD, a correspondence between the minimum bit rate corresponding to each physical size and each video bitstream corresponding to video data.

Each video bitstream is obtained by the server by encoding original video data according to the minimum bit rate corresponding to each physical size, and for the minimum bit rate corresponding to each physical size in the MPD, there is a video bitstream corresponding to the minimum bit rate.

Further, the server establishes, in the MPD, the correspondence between the minimum bit rate corresponding to each physical size and each video bitstream corresponding to the video data, so that the terminal acquires a video bitstream according to the correspondence between the minimum bit rate corresponding to each physical size and each video bitstream corresponding to the video data.

1004. The server receives a video bitstream acquiring request sent by the terminal.

The video bitstream acquiring request carries an identifier corresponding to video data that needs to be acquired by the terminal.

1005. The server receives a transcoding request sent by the terminal.

The transcoding request carries a proportional relationship between a minimum bit rate and real-time network bandwidth.

In this embodiment of the present invention, when the real-time network bandwidth is less than the minimum bit rate, the terminal sends the transcoding request to the server. In this embodiment of the present invention, when the real-time network bandwidth is less than the minimum bit rate, the terminal cannot fluently play a video resource; therefore, the terminal can fluently play the video resource only after the server performs transcoding processing on a video bitstream.

1006. The server transcodes, according to a proportional relationship, a video bitstream corresponding to a minimum bit rate.

Specifically, according to the real-time network bandwidth and the proportional relationship that is between the minimum bit rate and the real-time network bandwidth and carried in the transcoding request, the server performs a transcoding operation of reducing spatial resolution of the video bitstream by proportion or of reducing a frame rate of the video bitstream by proportion, so that the terminal can fluently play the video resource.

In this embodiment of the present invention, after transcoding the video bitstream, the server establishes, in the MPD, a correspondence between a minimum bit rate obtained after transcoding and a corresponding video bitstream. Further, the terminal acquires a corresponding video bitstream according to the correspondence, in the MPD, between a minimum bit rate obtained after transcoding and a corresponding video bitstream.

1007. The server sends the media index description MPD to the terminal.

Figure 11:
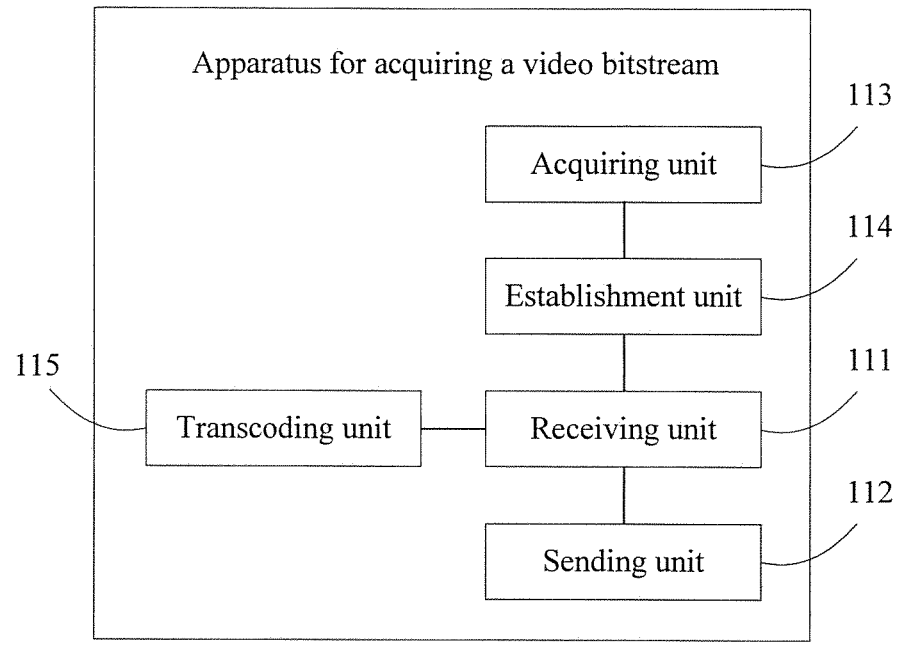
FIG. 11 is a schematic structural diagram of an apparatus for acquiring a video bitstream according to Embodiment 4 of the present invention.

The MPD includes the correspondence between the minimum bit rate corresponding to each physical size and each video bitstream corresponding to the video data. In this embodiment of the present invention, each video bitstream is obtained by the server by encoding the original video data according to each bit rate, and for each physical size in the MPD, there is a minimum bit rate and a video bitstream that are corresponding to the physical size. Further, for specific implementation of the method shown in FIG. 10, this embodiment of the present invention provides an apparatus for acquiring a video bitstream. As shown in FIG. 11, an entity of the apparatus may be a server, and the apparatus includes a receiving unit 111 and a sending unit 112.

The receiving unit 111 is configured to receive a video bitstream acquiring request sent by a terminal.

The video bitstream acquiring request carries an identifier corresponding to video data that needs to be acquired by the terminal.

The sending unit 112 is configured to: when the receiving unit 111 receives the video bitstream acquiring request, send a media index description MPD to the terminal.

The MPD includes a correspondence between a minimum bit rate corresponding to each physical size and each video bitstream corresponding to the video data.

Optionally, the apparatus may further include an acquiring unit 113 and an establishment unit 114.

The acquiring unit 113 is configured to acquire physical sizes corresponding to a terminal.

The acquiring unit 113 is further configured to acquire, according to a formula $r_{min}=u \times a^2 \times s^3 + v \times a \times s^2 + w \times s$, a minimum bit rate corresponding to each physical size.

In the formula, s is the physical size corresponding to the terminal, and u, v, w, and a are fixed values.

The establishment unit 114 is configured to establish, in the MPD, the correspondence between the minimum bit rate corresponding to each physical size acquired by the acquiring unit 113 and each video bitstream corresponding to the video data.

Optionally, the apparatus may further include a transcoding unit 115.

The receiving unit 111 is further configured to receive a transcoding request sent by the terminal.

The transcoding request carries a proportional relationship between a minimum bit rate and real-time network bandwidth.

The transcoding unit 115 is configured to transcode, according to the proportional relationship received by the receiving unit 111, a video bitstream corresponding to the minimum bit rate.

Figure 12:
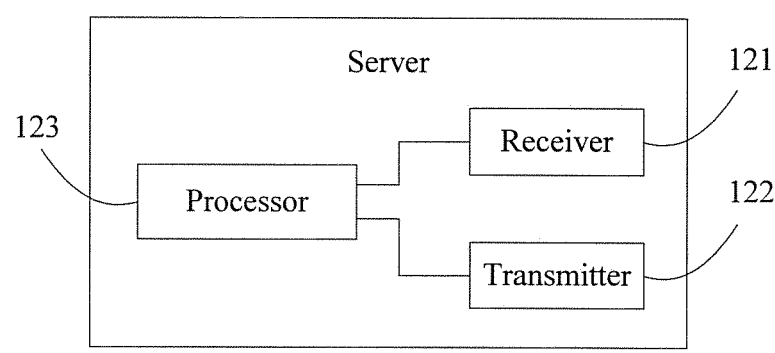
FIG. 12 is a schematic structural diagram of a server according to Embodiment 4 of the present invention.

Still further, an entity of the apparatus for acquiring a video bitstream may be a server. As shown in FIG. 12, the server may include a receiver 121, a transmitter 122, and a processor 123.

The receiver 121 is configured to receive a video bitstream acquiring request sent by a terminal.

The video bitstream acquiring request carries an identifier corresponding to video data that needs to be acquired by the terminal.

The transmitter 122 is configured to send a media index description MPD to the terminal.

The MPD includes a correspondence between a minimum bit rate corresponding to each physical size and each video bitstream corresponding to the video data.

The processor 123 is configured to acquire physical sizes corresponding to a terminal.

The processor 123 is further configured to acquire, according to a formula $r_{min}=u \times a^2 \times s^3 + v \times a \times s^2 + w \times s$, the minimum bit rate corresponding to each physical size.

In the formula, s is the physical size corresponding to the terminal, and u, v, w, and a are fixed values.

The processor 123 is further configured to establish, in the MPD, the correspondence between the minimum bit rate corresponding to each physical size and each video bitstream corresponding to the video data.

The receiver 121 is further configured to receive a transcoding request sent by the terminal.

The transcoding request carries a proportional relationship between a minimum bit rate and real-time network bandwidth.

The processor 123 is further configured to transcode, according to the proportional relationship, a video bitstream corresponding to the minimum bit rate.

It should be noted that for other corresponding descriptions corresponding to the functional units of the apparatus for acquiring a video bitstream provided in this embodiment of the present invention, reference may be made to corresponding descriptions in FIG. 10, and details are not described herein again.

According to the method and the apparatus for acquiring a video bitstream provided in this embodiment of the present invention, firstly, a terminal acquires a minimum bit rate corresponding to a parameter of the terminal; then, the terminal sends a video bitstream acquiring request to a server, and when receiving the video bitstream acquiring request sent by the terminal, the server sends an MPD to the terminal; and finally, the terminal receives the MPD sent by the server, and acquires a video bitstream according to the MPD and the minimum bit rate. Compared with a current case in which a corresponding bit rate is acquired by using network bandwidth, in this embodiment of the present invention, corresponding video bitstreams can be acquired, by using minimum bit rates corresponding to parameters of terminals, for the terminals that have different parameters, which can avoid a case in which a waste of network bandwidth exists when a terminal that imposes a relatively loose requirement on image quality of video data is being used, and can further improve utilization of the network bandwidth.

The apparatus for acquiring a video bitstream provided in this embodiment of the present invention may implement the foregoing provided method embodiments. For specific function implementation, refer to descriptions in the method embodiments, and details are not described herein again. The method and the apparatus for acquiring a video bitstream provided in this embodiment of the present invention may be applicable to a case in which a user downloads video data by using a terminal, which is not limited thereto.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for acquiring a video bitstream, the method comprising:
   acquiring, by a terminal, a physical size of the terminal;
   acquiring, by the terminal, a minimum bit rate corresponding to the physical size of the terminal, wherein the minimum bit rate is determined according to an exponential formula that includes the physical size of the terminal as a variable;
   sending, by the terminal, a video bitstream acquiring request to a server, wherein the video bitstream acquiring request comprises an identifier of video data that is to be acquired, the video bitstream acquiring request enabling the server to send a media index description (MPD) to the terminal according to the identifier of the video data, wherein the MPD comprises a correspondence between a minimum bit rate corresponding to each of one or more terminal physical sizes and each video bitstream corresponding to the video data;
   receiving, by the terminal, the MPD sent by the server; and
   acquiring, by the terminal, a video bitstream according to the MPD and the minimum bit rate.

2. The method according to claim 1,
   wherein the exponential formula comprises $r_{min}=u \times a^2 \times s^3 + v \times a \times s^2 + w \times s$, wherein s is the physical size of the terminal, and u, v, w, and a are fixed values.

3. The method according to claim 1, wherein acquiring, by the terminal, the physical size of the terminal comprises:
   acquiring, by the terminal, a physical size of a video display window of the terminal.

4. The method according to claim 1, wherein acquiring, by the terminal, a video bitstream according to the MPD and the minimum bit rate comprises:
   searching, by the terminal, for a target bit rate, wherein the target bit rate is a bit rate that matches the minimum bit rate; and
   acquiring, by the terminal according to the MPD, a video bitstream corresponding to the target bit rate.

5. The method according to claim 4, wherein:
   after acquiring, by the terminal, the minimum bit rate corresponding to the physical size of the terminal, the method further comprises:
   acquiring, by the terminal, real-time network bandwidth, and determining, by the terminal, whether the real-time network bandwidth is greater than or equal to the minimum bit rate; and sending, by the terminal, a video bitstream acquiring request to a server comprises:
sending, by the terminal, the video bitstream acquiring request to the server when the real-time network bandwidth is greater than or equal to the minimum bit rate, or
sending, by the terminal, a transcoding request to the server when the real-time network bandwidth is less than the minimum bit rate, wherein the transcoding request carries a proportional relationship between the minimum bit rate and the real-time network bandwidth, the transcoding request enabling the server to transcode, according to the proportional relationship, the video bitstream corresponding to the target bit rate.

6. A method for acquiring a video bitstream, the method comprising:
acquiring, by a server, one or more terminal physical sizes corresponding to one or more terminals;
acquiring, by the server according to an exponential formula, a minimum bit rate corresponding to each terminal physical size of the one or more terminal physical sizes, wherein each minimum bit rate is determined according to an exponential formula that includes the corresponding terminal physical size as a variable;
receiving, by the server, a video bitstream acquiring request sent by a terminal, wherein the video bitstream acquiring request carries an identifier corresponding to video data that is to be acquired by the terminal; and
sending, by the server, a media index description (MPD) to the terminal, wherein the MPD comprises a correspondence between a minimum bit rate corresponding to each of the one or more terminal physical sizes and each video bitstream corresponding to the video data, the MPD enabling the terminal to acquire a video bitstream according to the MPD and a minimum bit rate.

7. The method according to claim 6, wherein:
the exponential formula comprises $r_{min}=u \times a^2 \times s^3 + v \times a \times s^2 + w \times s$, wherein s is the terminal physical size, and u, v, w, and a are fixed values; and
the method further comprises:
establishing, by the server in the MPD, the correspondence between the minimum bit rate corresponding to each terminal physical size and each video bitstream corresponding to the video data, the correspondence enabling the terminal to acquire the video bitstream according to the correspondence between the minimum bit rate corresponding to each terminal physical size and each video bitstream corresponding to the video data.

8. The method according to claim 6, wherein before sending, by the server, the media index description (MPD) to the terminal, the method further comprises:
receiving, by the server, a transcoding request sent by the terminal, wherein the transcoding request carries a proportional relationship between the minimum bit rate and real-time network bandwidth; and
transcoding, by the server according to the proportional relationship, a video bitstream corresponding to the minimum bit rate.

9. An apparatus for acquiring a video bitstream, the apparatus comprising:

a processor, configured to acquire a physical size of a terminal, and acquire a minimum bit rate corresponding to the physical size of a terminal, wherein the minimum bit rate is determined according to an exponential formula that includes the physical size of the terminal as a variable;
a transmitter, configured to send a video bitstream acquiring request to a server when the processor acquires the minimum bit rate, wherein the video bitstream acquiring request comprises an identifier of video data that is to be acquired;
a receiver, configured to receive a media index description (MPD) sent by the server when the transmitter completes sending of the video bitstream acquiring request, wherein the MPD comprises a correspondence between a minimum bit rate corresponding to each of one or more terminal physical sizes and each video bitstream corresponding to the video data; and
wherein the processor is further configured to acquire a video bitstream according to the MPD and the minimum bit rate.

10. The apparatus according to claim 9, wherein the exponential formula comprises $r_{min}=u \times a^2 \times s^3 + v \times a \times s^2 \pm w \times s$, wherein s is the physical size of the terminal, and u, v, w, and a are fixed values.

11. The apparatus according to claim 9, wherein the processor is configured to acquire a physical size of a video display window of the terminal.

12. The apparatus according to claim 9, wherein the processor is further configured to:
search for a target bit rate, wherein the target bit rate is a bit rate that matches the minimum bit rate; and
acquire, according to the MPD, a video bitstream corresponding to the target bit rate.

13. The apparatus according to claim 12, wherein:
the processor is further configured to:
acquire real-time network bandwidth, and
determine whether the real-time network bandwidth is greater than or equal to the minimum bit rate; and
the transmitter is configured to:
send the video bitstream acquiring request to the server when the processor determines that the real-time network bandwidth is greater than or equal to the minimum bit rate, or
send a transcoding request to the server when the processor determines that the real-time network bandwidth is less than the minimum bit rate, wherein the transcoding request carries a proportional relationship between the minimum bit rate and the real-time network bandwidth.

14. An apparatus for acquiring a video bitstream, the apparatus comprising:
a processor, configured to:
acquire one or more terminal physical sizes corresponding to one or more terminals; and
acquire, according to an exponential formula, a minimum bit rate corresponding to each terminal physical size of the one or more terminal physical sizes, wherein each minimum bit rate is determined according to an exponential formula that includes the corresponding terminal physical size as a variable;
a receiver, configured to receive a video bitstream acquiring request sent by a terminal, wherein the video bitstream acquiring request carries an identifier corresponding to video data that is to be acquired by the terminal; and a transmitter, configured to: send a media index description (MPD) to the terminal when the receiver receives the video bitstream acquiring request, wherein the MPD comprises a correspondence between a minimum bit rate corresponding to each of the one or more terminal physical sizes and each video bitstream corresponding to the video data.

15. The apparatus according to claim 14, wherein:
the exponential formula comprises $r_{min} = u \times a^2 \times s^3 + v \times a \times s^2 + w \times s$, wherein s is the terminal physical size, and u, v, w, and a are fixed values; and
the processor is further configured to establish, in the MPD, the correspondence between the minimum bit rate corresponding to each terminal physical size and each video bitstream corresponding to the video data.

16. The apparatus according to claim 15, wherein:
the receiver is further configured to receive a transcoding request sent by the terminal, wherein the transcoding request carries a proportional relationship between a minimum bit rate and real-time network bandwidth; and
the processor is configured to transcode, according to the proportional relationship, a video bitstream corresponding to the minimum bit rate.

* * * * *

UNITED STATES PATENT AND TRADEMARK OFFICE
CERTIFICATE OF CORRECTION

PATENT NO. : 10,404,606 B2  
APPLICATION NO. : 15/177751  
DATED : September 3, 2019  
INVENTOR(S) : Zhuoyi Lv et al.

Page 1 of 1

It is certified that error appears in the above-identified patent and that said Letters Patent is hereby corrected as shown below:

In the Claims

Claim 10, Column 18, Line 24:  
"$r_{min} = uxa^2xs^3 + vxaxs^2 \pm wxs$"  
Should read:  
"$r_{min} = u \times a^2 \times s^3 + v \times a \times s^2 + w \times s$"

Signed and Sealed this  
Twenty-second Day of October, 2019

Andrei Iancu  
*Director of the United States Patent and Trademark Office*